United States Patent [19]

Kose et al.

[11] 3,969,433

[45] July 13, 1976

[54] IRIDESCENT COMPOSITION AND THE PROCESS OF PREPARING THE SAME

[76] Inventors: Akira Kose, 11-9, Nukui-kitamachi-3, Koganei; Tetsuko Kitayama, 40-15, Gohongi-1, Meguro, Tokyo, both of Japan

[22] Filed: May 8, 1974

[21] Appl. No.: 468,079

[30] Foreign Application Priority Data

May 11, 1973 Japan............................ 48-051596

[52] U.S. Cl................................ 260/885; 260/879; 260/881; 260/884; 260/886
[51] Int. Cl.²................... C08L 31/02; C08L 25/14
[58] Field of Search ........... 260/885, 884, 886, 881, 260/879, 880 R

[56] References Cited
UNITED STATES PATENTS

| | | | |
|---|---|---|---|
| 2,558,139 | 6/1951 | Knock | 260/885 |
| 2,569,767 | 10/1951 | Knock | 260/885 |
| 3,074,905 | 1/1963 | Douglas | 260/884 |
| 3,247,289 | 4/1966 | Sears | 260/884 |
| 3,461,188 | 8/1969 | Baer | 260/879 |
| 3,632,677 | 1/1972 | Petner | 260/885 |
| 3,733,371 | 5/1973 | Kose | 260/885 |

*Primary Examiner*—Paul R. Michl
*Attorney, Agent, or Firm*—Armstrong, Nikaido & Wegner

[57] ABSTRACT

A stabilized light reflecting iridescent polymeric material is provided. The new material comprises a three dimensional non-contiguous regular structure of uniform polymeric microspheres, wherein the center to center distance between the microspheres is in the range from about 1.500 to about 15,000A. The microspheres are obtained from a cross-linked polymeric latex and have a particle diameter size in the range from about 500 to about 10,000A. The polymeric structure is stabilized by polymerizing the suspending medium. The polymerized suspending medium containing the latex particles has a refractive index relationship expressed by the formula $$0.1 \geq \left| \frac{N_1 - N_2}{\alpha} \right| > 0,$$

wherein $n_1$ is the average refractive index of the polymerized suspending medium, $n_2$ is the average refractive index of the latex particles, and $\alpha$ is the degree of swelling of the latex particles in the suspending medium to provide optical discontinuity.

5 Claims, No Drawings

IRIDESCENT COMPOSITION AND THE PROCESS OF PREPARING THE SAME

BACKGROUND OF THE INVENTION

According to an article by J. W. Vanderhoff et al., Journal of the Optical Society of America, vol. 44, pp 603 – 609 (1954), when monodispersed latices of polyvinyltoluene and polystyrene, wherein the particles have a diameter in the range from about 100 to about 1000 m$\mu$, are dried to form a frail film, the particles of the latex spontaneously arrange themselves in a close-packed crystalline arrangement.

The resulting film is characterized by an iridescent surface color. The crystalline samples show beautiful iridescent effects under the illumination of white light. Unfortunately, iridescent films produced in this manner are too fragile for practical use. If the films are heat treated their mechanical strength is considerably improved, but there is a marked decrease in diffracting power, since heat treated samples are more transparent then untreated samples. As the samples become clearer, the diffracting power becomes weaker and, after prolonged heat treatmement, the final film is transparent and non-diffracting. On the other hand, according to Japanese Patent Sho-45-32046, a method of producing the iridescent color has been proposed, wherein aqueous latices are dried or semi-dried to form iridescent films or lumps. Such iridescent materials are imbedded in polyester resins, PMMA and the like, in order to achieve the final stabilization of the iridescent material.

In this invention, however, no refractive index relationship between the materials used to imbed the iridescent material and latex particles has been considered. Therefore, iridescent effects produced are considered to be poor. Thus heretofore, there has been no way of providing a stabilized, three-dimensional close packed iridescent structure. The known iridescent films are too fragile for practical use in decoration or for ornamental use and, if such films are heat stabilized, they lose their pronounced iridescent characteristics. The other known iridescent materials, to which no refractive index relationship between particles and material used to imbed the iridescent films or lumps has been taken into account, are considered to have less iridescent effects.

We have succeeded in providing a stabilized, iridescent structure which has superior iridescent effects and has wide, practical utility for decorative and ornamental use.

SUMMARY OF THE INVENTION

According to the present invention, a three-dimensional, non-contiguous, regularly arranged, structure of uniform, polymeric microspheres is provided, wherein the center to center distance between the microspheres is in the range from about 1,500 to about 15,000A. The microspheres are made from a cross-linked, polymeric latex and are characterized by a particle diameter size in the range of from about 500 to about 10,000A. The structure is formed in an organic phase, consisting of latex particles and a polymerizable suspending medium, wherein the effective volume fractions of the particles are in the range of 0.25 to 0.74. The structure is stabilized by polymerizing a polymerizable suspending medium, which, in turn, has a refractive index relationship expressed by the formula $$0.1 \geq \left|\frac{n_1 - n_2}{\alpha}\right| > 0$$

when polymerized, to that of microspheres to provide optical discontinuity. The new stabilized, light-reflecting polymeric material is made by maintaining a monodispersed, non-aqueous latex in a quiescent state until iridescence is observed. At this point, the particles of the latex become arranged in a manner of close packing, non-contiguous, regular structure in a closely packed arrangement. The non-aqueous latex comprises substantially uniform particles in an organic polymerizable suspending medium. The latex particles have an average diameter in the range of from about 500 to about 10,000A and have a uniformity such that 80% of the mass of the particles has a particle size within ± 10% of the average particle size of the entire mass, and have an effective volume fraction in the non-aqueous phase in the range of from about 0.25 to about 0.74. The iridescent, non-aqueous latex is then stabilized by polymerizing a polymerizable suspending medium which has no measureable solubilizing effect on the microspheres and which has a refractive index relationship expressed by a formula, $$0.1 \geq \left|\frac{n_1 - n_2}{\alpha}\right| > 0,$$

when polymerized, to provide optical discontinuity in the final product. The material used as the suspending medium is polymerized while maintaining it in a quiescent state to form a light reflecting, polymeric material exhibiting intense color caused by optical interference phenomena.

DETAILED DESCRIPTION

The iridescent material is made by a process involving following three steps.
I. SYNTHETIC LATEX SELECTION.
II.
1. PHASE TRANSFER OF SYNTHETIC LATEX, whereby latex particles transfer from an aqueous phase to an organic phase.
2. ADJUSTMENT OF REFRACTIVE INDEX, whereby refractive index relationship between latex particles and surrounding medium is fulfilled.
3. ADJUSTMENT OF LATEX PARTICLE CONCENTRATION IN AN ORGANIC MEDIUM, whereby effective volume fraction of particles required for the formation of three dimensional non contiguous regular structure of latex particles is attained.
III. FORMATION OF THREE DIMENSIONAL NON CONTIGUOUS ORDERED STRUCTURE OF LATEX PARTICLES AND STABILIZATION OF THE SAID STRUCTURE.

I. SYNTHETIC LATEX SELECTION

Synthetic latices, which are aqueous suspensions of ultramicrospheres prepared from synthetic high polymers, have been widely used for treating textiles, paper adhesives and the like. Specially prepared polystyrene latices, having a highly uniform particle size, are conventionally used as a standard for the calibration of the optical instruments, the magnification calibration of electron microscopes, and in medical studies and so forth.

Many kinds of high polymer synthetic latices are known, typical among these are polystyrene, polyvinyl toluene, styrene-butadiene copolymers, methyl methacrylate-acrylate copolymers, acrylonitrile-butadiene copolymers, vinyl chloride-vinyl acetate copolymers, vinylidene chloride-vinyl chloride copolymers, styrene-divinyl benzene copolymers and the like.

It is known that the particle size of the microspheres of these latices range between from about 500A to about 10,000A in diameter.

The particular synthetic latices useful in the present invention are characterized in a manner such that the latex particles do not swell when in contact with an organic suspending medium which is used during the formation of the three dimensional regular arrangement, or if such particles do swell, the particles swell to the extent that the shape and uniformity of the particles are retained and such particles do not dissolve.

To produce a stable, non-aqueous latex suspension, the polymeric latex particles must be substantially insoluble in the organic suspending medium, and consequently the nature of the polymer to be suspended determines the nature of the organic suspending medium.

Therefore, above mentioned required physical properties of the latex particles, with respect to the solubility, are dependent on the combination of constituent polymer of the latex particles and the organic suspending medium. In general, however, latex particles comprising linear polymers have poor organic medium solubility resistance and, accordingly, operable combinations of polymer and organic medium are very few and limited. Furthermore, such latex particles do not have desirable properties which are suitable for commercial use.

The more useful and preferable latex particles are obtained from cross-linked copolymer latices, such as copolymers of alkyl esters of methacrylic acid and divinyl benzene, alkyl esters of acrylic acid and divinyl benzene, styrene and divinyl benzene copolymer, styrene derivatives and divinyl benzene and also copolymers of alkyl esters of acrylic acid, alkyl esters of methacrylic acid, styrene, and styrene derivatives with each of ethylene glycol dimethacrylate and allyl methacrylate.

The above mentioned latices are characterized by two or three dimensional networks of polymer structure which are produced by cross-linking an ethylenically unsaturated monomer with another polymerizable monomer having two ethylenically unsaturated groups in molecule. Such latices having net work structure in the polymer molecules can fulfill an essential property when combined with various kinds of organic media; when latex particles are dispersed into an organic medium, the particles are not affected by any solubilizing effects or the particles only swell to an extent at which the particles are not dissolved resulting in a homogeneous polymer solution.

Upon the synthesis of such latices, care must be taken with the varieties of monomers and cross-linking agent combinations and the ratio of the composition. This is important, since the combination and ratio of the composition are related to the optical properties, that is, the refractive indecies of the resulting particles, and the degree of swelling of the particles in an organic medium.

Optical discontinuity throughout the iridescent material according to the present invention can be provided in the following two ways, that is, by selecting either (1) an appropriate organic suspending medium fulfilling specific refractive index relationships against that of latex particles when stabilization has been completed, or (2) an appropriate latex particles fulfilling the refractive index relationships compared with that of the surrounding medium.

In the former case, where the refractive index conditions are adjusted by selecting the appropriate combination of suspending media, polymers constituting the latex particles can be selected from various kinds of polymers. In the latter case, merits can be pointed out that when the some limited suspending medium must be employed.

The refractive index relationships between the latex particles and surrounding medium are very important factors connected with the dominant reflected wavelength (interference color with $\theta = 90$ in the eq.(8) and transparency of the iridescent material.

Latex particles having desirable refractive indecies can be synthesized by selecting suitable single, polymerizable, non-cross-linking, monomers or combinations of two or more species of polymerizable monomers, and polymerizable cross-linking monomers which are characterized by having two ethylenically unsaturated groups in their structure, and selecting a proper ratio of the compositions.

In general, polymerizable non-cross-linking ethylenically unsaturated monomers used as a major composition of the latex particles include alkyl methacrylates such as methyl methacrylate; ethyl methacrylate; n-propyl-, iso-propyl, n-butyl, iso-butyl, hexyl, octyl methacrylate; alkyl acrylates such as methyl acrylate; ethyl-, n-propyl, iso-propyl, n-butyl, iso-butyl, hexyl, octyl acrylate; styrene and styrene derivatives such as methyl styrene, dimethylstyrene, ethylstyrene, diethylstyrene, monochlorostyrene, monochloromethyl styrene, monochlorodimethyl styrene, dichlorostyrene, dichloromonomethylstyrene, monobromostyrene, dibromostyrene, vinyl acetate, vinyl chloride, and so forth.

It is apparent from the foregoing description that the species and amount of cross-linking agents, which are characterized by two ethylenicaly unsaturated groups in its molecular structure, affect not only the refractive index of the resulting latex particles, but also the degree of swelling of the particles, $(\alpha) = $ (volume of particles after swelling /volume of particles before swelling), in an organic suspending medidium.

In general, the greater the amount of cross-linking agent employed, the less the degree of swelling of the particles and vice versa.

The degree of the swelling of the particles is one of the most important factors to determine the effective volume fraction of particles, which in turn is one of the most basic and important conditions related to the formation of the three dimensional, noncontiguous regular arrangement of the particles in the present invention.

Accordingly, the amount of cross-linking agent must be chosen by taking into consideration the effect upon particle swelling in addition to the effect upon the refractive index of resulting particles. The amount of cross-linking agent employed in the copolymer and which affects the degree of swelling of the particles cannot be specifically determined, since it is dependent on the type of cross-linking agent employed and also on the combination of polymeric monomers used as a major component of the latex particles.

However, in the case of the combination of methylmethacrylate-divinyl benzene, an amount of divinyl benzene less than about 20% by volume based on the monomer is recommended and in the case of styrene-divinyl benzene, an amount of divinyl benzene less than about 15% is recommended when considering the degree of swelling and desirability of preparing a latex having a higher degree of uniformity.

As cross-linking agents, the following polymerizable monomers are useful; divinyl benzene, ethylene glycol dimethacrylate, allyl methacrylate, allyl acrylate, diallyl phthalate, diallyl sebacate, butadiene, and the like.

Synthetic cross-linked latices can be emulsion-polymerized; a mixture of the above mentioned polymerizable, non-cross-linking monomer and polymerizable cross-linking monomer is emulsified into an aqueous phase with the aid of surface active agents and polymerization is heat initiated using water-soluble, free radical initiator such as potassium, sodium or ammonium persulfate, hydrogen peroxide, cumene hydroperoxide, and the like.

Throughout the regular, three-dimensional structure, the particles are arranged in a manner such that the particles do not contact each other, in other words, the particles are non-contiguously arranged, in a manner of close-packing. The particles have been swollen by the polymerizable suspending, medium and, therefore, it is difficult to determine whether the particles have a suitable diameter size from the actual particle size. However, from the view point of ease of synthesis of monodispersed latex and handling of the latex, the particles having a diameter ranging from about 500 to about 10000A are preferably used in the present invention. In addition to the above mentioned required physical properties, the latex particles must have a uniform particle size, and such latices are referred to as monodispersed latices. In preparing a perfectly regular, close-packing array of particles in a three-dimensional structure, the size distribution should be as narrow as possible; ideally the deviation in particle size should be zero. Because it is impossible to prepare a latex of perfect uniformity, some variation in particle size is acceptable. A reasonable variation is defined as 80% of the mass of particles having a particle size within ±10% of the average particle size of the mass. We found that the regularity of the three-dimensional arrangement becomes disturbed and, correspondingly, the iridescent effect becomes inferior, if the size distribution is less uniform than such variation. The resulting structure becomes irregular and the iridescent effects produced are markedly decreased.

A highly regular arrangement of latex particles, however, can also be obtained from a latex having less uniformity in particle size by controlling the conditions under which the three-dimensisonal regular structure is obtained, due to a segregation effect which occurs during the growth of three-dimensional structure. According to the direct observation of latex having relatively large particle size under the optical microscope, growth of the particles of the regular structure which provide the major part of the mass of particles size distribution are predominate, and particles having different particle size from that of major part tend to be segregated from the structure. However, it takes considerably longer time to grow regular structures which initially contain microscopic dimensions up to macroscopic dimentions which can be observed with the naked eye. The formation of the three-dimensional structure takes more time compared with the time required to form such a structure from a latex having a highly uniform particle size. Because of time requirement, it is the best to use a latex having the highest possible degree of particle size uniformity. If the particle size destribution deviates considerably from the 80% uniformity, it is not possible to form a three-dimensional regular structure and, accordingly, no iridescent effect is produced.

If such a structure can be formed, the growth pattern of the individual structure is hindered to result in microscopic particles in the regular structure and, accordingly, the iridescent effect is markedly decreased. In general, the size distribution of synthetic latices can be conventionally determined from the electron micrographs. Latex useful in the present invention can be determined by the following simple method. To an "as polymerized" aqueous latex having a particle concentration greater than about 10% solids content, is added a mono-bed-type ion exchange resin and the appearance of an iridescent effect upon deionization of the latex is observed. If the strong, iridescent effect appears on the wall of the container, the latices can be useful, and, if not, the latices do not fulfill required conditions of particle size uniformity (monodispersity). If the latices have larger particle sizes to show a high order of interference color, and the latices have smaller particles having a size of less than about 800A, such latices do not show strong iridescent effects notwithstanding the fact that a three-dimensional regular arrangement of the particles has been formed. In such cases, conventional electron microscopy methods must be employed in order to determine the usefulness of the latex as related to the particle size uniformity.

The latices used in the present invention are made by conventional emulsion polymerization methods. If the resulting latex suspension prepared by conventional means does not satisfy the required conditions of particle size uniformity, conventional methods such as hydraulic elutriation or centrifugation separation can be used in order to provide a latex having the necessary physical characteristics.

II. THE TRANSFER OF THE LATEX PARTICLES FROM THE AQUEOUS PHASE TO THE ORGANIC PHASE

The formation of the three-dimensional, non-contiguous, regular arrangement structure of the latex particles is achieved in the organic suspending medium. In general, synthetic latices are obtained by emulsion polymerization in an aqueous phase; however, non-aqueous dispersion methods may also be employed. Therefore, such latex particles produced in an aqueous phase do not disperse directly into an organic phase because of the hydrophilic properties of the particle surface. The transfer of the latex particles from an aqueous phase to the organic phase can be carried out by one of following three methods.

1a. Dry Method

An aqueous latex is dried after the purification of polymerized latex by conventional means. The dried lumps comprising latex particles is immersed directly into a polymerizable monomer, and the particles gradually begin to disperse into the organic medium from the surface of the lumps and the non-aqueous latex suspension can be obtained within several hours. In this case, if the drying temperature of the latex is too high, the particles sinter to each other and it is difficult to disperse the dried latex in the organic suspending medium. From the view point of preparing a perfectly dispersed non-aqueous latex, drying of the latex should be carried out under relatively lower temperature. We have found that complete dispersion of organic latex particles can be achieved by means of low temperature vacuum drying and lyophilization of the aqueous latex. This is the preferred method as compared with the other two methods described below since the water content of the dried latex can be substantially lowered and the moisture problem, which may cause bulk polymerization of the monomer in the subsequent processes, can be satisfactorily eliminated. However this method cannot be applied to the latex having relatively low glass transition temperatures.

1b. Flushing Method

This process has been conventionally used in the color industry to transfer a pigment from an aqueous phase to an organic phase. In general, the surface of the latex particles have hydrophilically charged groups and such particles tend to readily and stably disperse throughout an aqueous phase. Therefore the hydrophilic properties of the particle surfaces must be changed to oleophilic properties in order to transfer the particles from an aqueous phase to an organic phase. Hydrophilic properties can be changed to hydrophobic properties by using surface active agents having oppositely charged hydrophilic groups. That is, if the surface charge of the latex particles is negative, cationic surface active agents must be employed (and vice versa) in order to carry out the transfer of the particles. By changing the surface properties of the latex particles, such particles can be transferred from the aqueous phase to the organic phase. Surface active agents useful in this process involve cationic surface active agents, such as tetraalkyl ammonium bromides, tetraalkyl ammonium chlorides, tetraalkyl ammonium hydroxides, alkyl dimethyl benzyl ammonium chlorides, and the like, and anionic surface active agents, such as alkali metal salts of alkyl sulfates, alkyl allyl sulfonate alkali salts, alkali metal salts of alkyl sulfosuccinates, alkali metal salts of naphthalene sulfonate and the like. An aqueous solution containing at least one of the above mentioned surface active agents if added to the aqueous latex and the mixture is stirred and the latex particles become coagulated to form a paste. The coagulated particles are separated from the liquid phase and, to the paste or coagulated particles, is added an organic medium, such as benzene, dichloromethane, methylmethacrylate monomer, styrene monomer and the like and the mixture is continuously stirred and the particles are re-dispersed. The water in the paste is removed by means of the organic medium, removing the water which is present in the paste. This flushing method can also be carried out in the following way.

An organic solvent, in which an appropriate surface active agent is dissolved, is mixed with an aqueous latex. Upon continuous stirring, the particles gradually transfer to the organic phase from the aquious phase.

Upon carrying out these two processes care must be taken to remove substantially all of the water from the flushed non-aqueous latices, since the presence of water will result in affecting the subsequent processes and also the optical properties of the final products.

The amount of surface active agent used for the phase transfer of the latex can be determined from the surface charge density values of the latex particles. The surface charge density of the particles is determined by the titration of the latex suspension with alkali hydroxide aqueous solution by means of electroconductmetric methods. The amount of the surface active agent preferably used in these processes is about five times as much as the moles of surface charge groups.

This flushing method can be applicable for most kinds of latices to satisfactorily obtain stable, non-aqueous, latex suspensions, except for styrene-butadiene copolymer latex (styrene/butadiene, 25/75), such as those having low glass transition temperatures.

1c. Solvent Substitution Method

An aqueous latex and water miscible organic solvent are placed into a container separated into two cells by membrane having micro-pores, the size of which is smaller than that of latex particles, and larger than that of solvent molecules. Through the membrane water and the organic solvent can be freely mixed with each other and, thus, the water is gradually substituted with an organic solvent. Organic mediums containing relatively large amounts of water are replaced by a water-free organic medium. By repeating this procedure, organic latex suspensions having lower water content can be obtained.

Water miscible organic media used in this process include methanol, ethanol, n-propanol, iso-propanol, acetone, dioxane, methylcellosolve, ethylcellosolve, ethylene glycol, glycerin and the like.

The organic latex suspension thus obtained can be, in turn, substituted by any desirable non-aqueous media by means of the same process as mentioned above.

An evaluation of the degree of organic solvent substitution can easily be determined by mixing a drop of the non-aqueous latex, wherein suspending medium is a water-miscible organic solvent, with a solvent which is going to be used in the subsequent steps. If smooth and good dispersion is obtained, the substitution has been satisfactorily made, and, if not, the procedure must be repeated until good dispersion is obtained.

The main disadvantage of this method is that the residual amounts of water and solvent are difficult to remove. However, the greatest advantage is that latices having film-forming properties at relatively low temperatures, e.g. styrene-butadiene copolymer latices, methylmethacrylatebutadiene copolymer latices, and the like, can only be transferred to an organic medium by this substitution method.

Aqueous latices are transferred by any one of three methods mentioned above.

Non-aqueous, monodispersed latices or simply non-aqueous latices will be hereinafter referred to as non-aqueous suspension latices having a uniform particle size.

II-2. ADJUSTMENT OF REFRACTIVE INDEX OF ORGANIC SURROUNDING MEDIA

One of the most important required conditions of the present invention is the refractive index relationship between the latex particles and the surrounding medium.

If the refractive index difference between the latex particles and surrounding medium is too great, the intensity of the reflected, iridescent color becomes increased to an extent that an incident beam of light will not penetrate into the deeper portions of the composition and accordingly, the iridescent effect is substantially decreased. On the other hand, if the refractive index difference is equal to zero, the necessary optical discontinuity throughout the composition is not obtained and, correspondingly, the material becomes transparent and there is no iridescent effect.

We have found that both iridescent effects and transparency of the composition are superior when the refractive index difference between the microspheres and surrounding organic polymeric medium is expressed according to the following relationship:

$$0.1 \geq \left|\frac{n_1 - n_2}{\alpha}\right| > 0, \qquad 1.$$

where $n_1$ denotes the average refractive index of the surrounding polymeric medium, $n_2$ denotes the average refractive index of polymeric latex particles and $\alpha$ denotes the degree of swelling of the latex particles in the organic suspending medium (the ratio of the volume of the particles after swelling to that of particles before swelling).

In general, as far as practical use is concerned, the requirement for transparency, dominant iridescent color and type of iridescent effect are somewhat subjective. Particular combinations of these properties depends upon the intended use and the preference of the user. The difference in refractive index is extremely important with respect to controlling these requirement. The required refractive index variation can be produced either by the proper choice of a single material as a surrounding material or, if this is not satisfactory, the choice of a mixture wherein the mixed materials have a refractive index differing from each other. Suitable suspending media to be used include ethylenically unsaturated polymerizable monomers, synthetic high polymers, cellulose derivatives and the like. Typical polymerizable monomers include alkyl methacrylates such as methyl methacrylate, ethyl methacrylate, chloroethyl-, allyl-, n-propyl, iso-propyl, methallyl, n-butyl, iso-butyl-, n-amyl-, iso-amyl-, cyclohexyl-, n-hexyl-, benzyl-, n-octyl-, ethylene glycol- and ethylene glycol dimethacrylate; alkyl acrylates, such as methyl acrylate, ethyl acrylate, n-propyl, iso-propyl-, n-butyl-, n-amyl-, n-hexyl-, n-heptyl, n-octyl acrylate; and vinyl acrylate, allyl acrylate; styrene and styrene derivatives such as methyl styrene, dimethylstyrene, ethylstyrene, diethylstyrene, divinylbenzene, iso-propylstyrene, o-n-butylstyrene, chloro-, o-chloro-methyl-, dichloro-, o-bromo-, methoxy-, o-cyano-, para-cyano-methylstyrene; other polymerizable materials such as dimethyl maleate, diethyl maleate, di-n-butyl maleate, dimethyl fumarate, dimethyl itaconate diethyl itaconate, vinyl acetate, vinyl butyl butyrate, vinyl chloride, diallyl maleate, diallyl phthalate, diallyl sebacate, butadiene, and the like.

Typical synthetic high polymers, which have a linear polymer structure and are soluble in an organic suspending medium, include polymethyl methacrylate, polyethyl methacrylate, polybutyl methacrylate, and the like, polyalkyl acrylates, wherein numbers of carbon is upto eight, and polystyrene and linear polymers of styrene derivatives, and the like.

Typical cellulose derivatives soluble in an organic suspending medium include cellulose nitrate, ethyl cellulose, methyl cellulose, ethyl hydroxy cellulose, benzyl cellulose, cellulose acetate, and the like. Volatile non-polymerizable organic suspending mediums, which are independent from the refractive index relationship, are also useful as suspending mediums for the formation of three-dimensional regular structures. These are benzene and its derivatives alkyl alcohol esters, dichloromethane, and the like. When three-dimensional, regular arrays of particles stabilized by polymerizing a single polymerizable monomer or mixture of polymerizable monomers are employed, the shift of the refractive index caused by polymerization must be considered.

If the structure is to be stabilized by evaporation of the volatile liquids, the refractive index relationship expressed by equation (1) must be fulfilled upon the completion of evaporation of the liquids. In other words, in the three-component system, that is, volatile liquid, non-volatile surrounding material and latex particles, equation (1) must be fulfilled as to the relationship between the non-volatile surrounding material and the latex particles.

ADJUSTMENT OF PARTICLE CONCENTRATION IN AN ORGANIC PHASE.

Iridescent effects according to the present invention are caused by the Bragg reflection of visible light due to the three-dimensional, regularly arranged structure of the particles in an organic medium. We have found that one of the most important factors relating to the formation of the said structure, in the suspending medium, is the effective volume fraction of the particles in the system, and that the effective volume fraction of the particles must be equal to or greater than 0.25 and less than 0.74. In general, particles present in an organic suspending medium swell due to the solvation effects of the organic medium. Therefore, the actual volume fraction of the particles determined initially from the dried weight and specific gravity of the particles is different from the subsequent volume of swollen particles in the system, that is, the volume fraction effectively occupied by the particles in the system.

The relationship between actual volume fraction of particles ($\phi$m) and effective volume fraction ($\phi$ effective) is expressed according to the following equation:

$$\theta \text{ effective} = \alpha \theta \text{ m} \qquad 2.$$

where $\alpha$ denotes degree of swelling of the particles in an organic medium, that is, $$\alpha = \frac{\text{volume of swollen particle}}{\text{volume of particles before swelling}}$$

The degree of swelling ($\alpha$) of particles will show different values depending upon the kinds of synthetic polymers employed, the degree of cross-linking of particle polymer, kinds of organic suspending medium used, and a of combination of all three factors.

Therefore, upon adjustment of the effective volume fraction of the particles for the formation of the three-dimensional, regularly arranged particles, the degree of swelling, ($\alpha$) must be determined for each combination of the three factors mentioned above. The degree of swelling can be determined by using physico chemical means, such as viscosity measurement, light scattering, measurements of sedimentation velocity of the particles in the corresponding medium, and the like. In this invention value ($\alpha$) is determined by viscosity measurements. In general, the specific viscosity of a suspension containing spherical particles is express as follows:

$$\eta_{sp} = 2.5\ \phi + k'\ \phi^2 \qquad 3.$$

where $\phi$ denotes the volume franction of particles in the system and $(k')$ denotes some coefficient. Equation (3) can be applied to the organic suspension of polymeric microspheres by introducing the vale for the degree of swelling $(\alpha)$ for the particles and equation (3) becomes $$\eta_{sp} = 2.5\ \alpha\phi_m + \beta\phi_m{}^2 \qquad 4.$$

where $(\beta)$ denotes some coefficient relating to $(k')$ including $(\alpha)$. Reduced viscosity is obtained from equation (4) as follows:

$$\eta_{red} = \eta_{sp}/\phi_m = 2.5\ \alpha + \beta\phi_m \qquad 5.$$

From equation (5), intrinsic viscosity can be obtained by the following formula:

$$[\eta] = \lim_{\phi_m \to 0} \eta_{sp}/\phi_m = 2.5\alpha \qquad 6.$$

The values of $[\eta]$ are obtained by viscosity measurements of the organic latex suspension upon dilution of the suspension. The values thus obtained are plotted against the actual volume fraction $(\phi m)$.

The intrinsic viscosity is obtained by extrapolation of the curve $\eta_{sp}/\phi_m$ VS $\phi_m$ plot to find the point of intersection at $\phi m = 0$. In turn, $(\alpha)$ is determined by $[\eta] = 2.5\ \alpha$ knowing $[\eta]$.

The degree of swelling varies depending upon the combination of various polymeric particles and various suspending media and, accordingly, value $(\alpha)$ must be determined on a case by case basis. The effective volume fraction of polymeric particles in the non-aqueous latex suspension must be adjusted to be in the range of $0.25 \leq \phi$ effect $< 0.74$ by using value $(\alpha)$, actual weight fraction and specific gravity of particles. Organic, monodispersed latices thus prepared are allowed to stand quietly and the suspension begins to reveal beautiful, iridescent colors at the container-suspension interface and through the entire body of the suspension, depending on the effective particle volume fraction of the system. This an indication that the latex particles spontaneously have arranged themselves in a three-dimensional, non-contiguous structure in a manner of close-packing. The effect of the effective volume fraction of particles upon the formation of the three-dimensional, non-contiguous regular structure of the particles and the state of iridescence are classified into the following typical five categories.

| I | 0.00 | $\leq$ | $\phi$ effective | $<$ | 0.25 | |
|---|---|---|---|---|---|---|
| II | 0.25 | $\leq$ | $\phi$ effective | $<$ | 0.50 | |
| III | 0.50 | $\leq$ | $\phi$ effective | $<$ | 0.55 | |
| IV | 0.55 | $\leq$ | $\phi$ effective | $<$ | 0.74 | |
| V | 0.74 | $\leq$ | $\phi$ effective | $<$ | 1.00 | 7. |

I. In this region no regularly arrangement of the particles can form and, accordingly, no iridescent color having angle dependency can be observed.

II. The entire body of the suspension reveals a pale iridescent color having angle dependencies. As the effective volume fractions of the particles approach 0.5, the iridescent color becomes intense and vivid.

III. In this range, tiny flecks showing iridescent color begin to appear in the bulk of the suspension. Upon quiet standing, such iridescent flecks settle to form iridescent layers, densely packed with iridescent flecks, leaving the upper layer with a pale iridescent color which has angle dependency. Colors of iridescent flecks have also angle dependencies, that is, at a normal incident beam of light, it shows colors of maximum wavelength and, the lower the angle of incidence, the shorter the wavelength of the reflected interference color. As the $\phi$ effective approaches 0.55, the layer packed with iridescent flecks increases in size, however, a change in dominant iridescent color does not occur.

IV. The entire body of the suspension becomes occupied by the iridescent flecks. Upon an increase in $\phi$ effective, the dominant colors of reflected light from the iridescent flecks shifts to shorter wavelengths.

V. In this range, the surface of the latex particles contact each other, and upon an increase in $\phi$ effective, the areas of contact of the particles increase, and, accordingly, the optical discontinuity is lost and the iridescent effect is drastically decreased.

As mentioned above, effective volume fraction of latex particles in the system is a very important factor on the appearance of the iridescent effects and, accordingly, the adjustment of the effective volume fraction must be carried out with great care. If the effective volume fraction of the latex particle is greater than 0.74, the volume fraction must be reduced by the addition of a proper amount of suspending medium; on the contrary, if the volume fraction is less than 0.25 the volume fraction must be increased by addition of required amount of particles or by evaporation of suspending medium, centrifugation, filtration and so forth in order to adjust the effective particle volume fraction to be in the range equal to or greater than 0.25 and less than 0.74. This means that the effective volume fraction must be in the range of 0.25 and less than 0.74 until the final stabilization of the three-dimensional, non-contiguous regular arrangement is achieved by polymerization or by evaporation.

Therefore, the required condition of the volume fraction is not always necessary to be fulfilled at the initial stage of the preparation of the suspension. That is, in the case where the stabilization of the three-dimensional, regular structure is achieved by evaporation of the suspending medium, such as, the formation of iridescent film by coating, the volume fraction of the particles varies with the evaporation of the volatile liquid used for the suspending medium. In this case, the contribution of the volume fraction of volatile liquid should be eliminated upon determining the particle volume fraction and the particle volume fraction is estimated from the volume fraction of the particles and that of non-volatile component other than the particles. Of course, the value of the volume fraction of the particles must be in the range of from 0.25 to less than 0.74.

III. FORMATION AND STABILIZATION OF A THREE DIMENSIONAL NON-CONTIGUOUS REGULAR STRUCTURE OF PARTICLES.

To the non-aqueous monodispersed latex suspension fulfilling the required conditions with respect to particle size, size distribution, refractive index conditions, effective volume fraction of particles as mentioned above, is added a free radical initiator and/or a photopolymerization initiator as necessary, and the suspension is allowed to stand quietly in a suitable container.

Upon standing for from about a few minutes to about more than several hundred hours, an iridescent color having angle dependencies and iridescent flecks begin to appear at the suspension-container interface and throughout the body of the suspension. This appearance of the iridescent effects indicates that the particles have spontaneously arranged themselves into a three dimensional, non-contiguous, regular structure of arrangement in a manner of close packing. The resulting structure of regular arrangement of the particles can be classified as the face-centered, cubic, close-packed (f.c.c.) structure.

In most cases, the iridescent region at the interface is considered to be a (111) plane of the f.c.c. structure oriented parallel to the wall of the container. The color changes of the iridescent structure are dependent upon the center to center distance between particles making up the structure, the angle of the incident beam of light, and the average refractive indecies of the constituent materials of the structure. The underlying principle of this iridescent phenomena can be attributed to Bragg's reflection of visible light caused by regular arrangement.

The correlation between observed color and center to center distance between particles, incident beam angle and refractive index of the constituent material is as follows:

$$2 n D \sin \theta = m \lambda \qquad 8.$$

where $n$ denotes the average refractive index of the constituent materials; D denotes distance between reflecting net planes related to center to center distance between particles and indecies of reflecting net plane; $\theta$, the angle of the incident beam of light; $m$, the order of interference (a positive interger, 1, 2, 3, . . . ) and $\lambda$, the wave length.

Each of the Units in formula (8) above are further defined as follows:

$$n = (1 - \phi m) n_1 + \phi m\, n_2 \qquad 9.$$

where $n_1$ denotes refractive index or organic polymerized surrounding medium, $n_2$ denotes the refractive index of latex particles, $\phi m$, the actual volume fraction of the latex particles in the system;

$$D = \sqrt{2} \cdot D_c/R \qquad 10.$$

$$Dc = \sqrt[3]{\frac{0.74}{f}} \cdot \sqrt[3]{\alpha} \cdot d \qquad 11.$$

Wherein Dc denotes the center to center distance between the latex particles in the f.c.c. structure is in A unit; R is the coefficient related to the reflecting net planes (111), $R = \sqrt{3}$ (220), $R = 2\sqrt{2}$ (200), $R = 2$    12.

$f$ is the coefficient relating to the effective volume fraction of the particles in the system, wherein $f = \phi$ effect. $\geq 0.25$ when $0.25 \leq \phi$ effect. $< 0.50$ $f = 0.55$  $0.50 \leq \phi$ effect. $\leq 0.55$ $f = \phi$ effective $< 0.74$  $0.55 < \phi$ effect. $< 0.74$  13.

$\alpha$, is the degree of swelling of the particles in the suspension, and $d$ is the actual particle size in the latex determined by electron microscopy.

After formation of the three-dimensional, non-contiguous regular structure of the particles has been achieved by quiet standing of the non-aqueous monodispersed latex suspension, that is, after the appearance of iridescent effects, stabilization of the said structure is carried out by initiating polymerization by means of heat and/or irradiation.

When the stabilization is achieved by evaporation of the volatile liquid, at on early stage of quiet standing, the required conditions for the formation of the iridescent structure is not always necessary, but, upon the evaporation of the volatile liquid, the required conditions as to volume fraction must be fulfilled. Thus, the formation of the iridescent structure of the uniform particles is achieved, and stabilization of the structure is achieved.

The iridescent composition produced according to the invention displays beautiful and varied iridescent flecks which change color depending upon the angle of the observation. Furthermore, because of the transparency of the composition, incident light can penetrate into the deeper portion of the structure so that the reflections from another plane, such as the (220) and the (200) planes can be observed, thus providing unexpectedly beautiful iridescent effects.

The following examples are illustrative of the present invention, however, they are not intended to limit the scope thereof.

EXAMPLE I

Monodispersed methyl methacrylate-divinyl benzene copolymer (DVB contents, 2.5% by volume on monomer basis) latex was prepared by emulsion polymerization. According to electron micrographs, the particle size was determined to be 1,580A and particle uniformity was high (greater than 80%).

The aqueous latex was purified by using a mono-bed type ion exchange resin. The purified latex was placed in a glass container and dried in an air bath at a temperature of 50°C for about 24 hours. The dried latex was obtained in the form of thin flakes about 1-2mm thick and having pale violet interference color on the surface. The refractive index of the copolymer latex was about 1.503.

As to methyl methacrylate-divinyl benzene monomer mixtures of various composition ratios, one mixture particularly fulfilling the required refractive index condition to that of the particles was MMA 95/DVB 5, with a refractive index of the monomer mixture of about 1.422 and the refractive index of the copolymer obtained from the mixture was about 1.506.

A 5% solids volume, non-aqueous latex suspension was prepared by dispersing 1.253 grm. of dried latex flakes into the MMA-DVB monomer mixture. The viscosity of the non-aqueous latex suspension was measured by using Ubberohde internal dilution viscometer, and the intrinsic viscosity was determined to be $[\eta] = 9.5$ and correspondingly, the degree of swelling of the particles in the system was determined to be $(\alpha) = 3.8$. 22.5grs. of dried latex flakes were added to 100ml of MMA-DVB monomer mixture (5% by volume DVB content) and the mixture was stirred to obtain a homogeneous, non-aqueous latex suspension. The actual volume fraction of the particles in the suspension thus prepared was determined to be 0.159 and accordingly, effective volume fraction of the particles in this system was calculated to be 0.60. The value of effective volume fraction satisfied the required condition for the formation of the three-dimensional structure, that is, the value was in the range greater than or equal to 0.25 and less than 0.74. To the suspension was added 1% by weight of AIBN based on the mixed monomers and the mixture was stirred; the non-aqueous latex suspension containing free radical initiator was placed in a quartz container, stoppered, and was allowed to stand quietly. Upon three to 24 hours quiet standing, many flecks having green iridescence began to appear at the interface between the milky white suspension and quartz container. The iridescent suspension was then subjected to U.V. radiation using 400W high pressure mercury arc for about 30 mins. The suspension was then placed into a water bath having a temperature of 70°C for 3 hours to initiate polymerization of the mixed monomers and final polymerization was effected at a temperature higher than 70°C to obtain complete stabilization of the iridescent material.

As the polymerization of the suspending medium was continued, the transparency of the system gradually increased, and the presence of iridescent flecks in the deeper portion of the suspension was observed. The dominant reflected wave length of the iridescent composition shifted slightly to the longer wavelength. The product thus obtained showed pronounced iridescent effects and the colors of iridescent flecks changed from green to blue and to violet with the change of the angle of view and illumination. The product has good mechanical strength and thermal durability and resembled that of known PMMA casting products.

EXAMPLE II – XII

Three kinds of aqueous monodispersed latices of MMA-DVB copolymers having different DVB contents were emulsion polymerized by conventional means. "As polymerized"-aqueous latices were purified by using a mono-bed type ion exchange resin (Rohm and Haas MB-3). Each latex showed beautiful iridescence. From the appearance of the iridescence, the latices were determined to be useful in this invention from the viewpoint of uniformity in particle size and of particle diameter. Each latex was dried at 40°C in an air bath in order to obtain dried latex flakes. Degree of swelling of the latex particles was determined by viscosity measurements of each latex containing various combinations of mixed monomers. In Table I, are summarized the degree of swelling of the particles for each latex and the particle diameter determined by electron microscopy.

From the values of ($\alpha$) shown in Table I, samples having effective volume fraction of 0.6, 0.53, and 0.4, were prepared. To the samples were added free radical initiators and the containers were filled with nitrogen gas and were allowed to stand in a quiescent state for about ten hours. Specific recipes for each sample are summarized in Table II. In the case of Examples II–IV the entire body of the suspension contained densely packed iridescent flecks and the iridescence was green in color.

In the case of Examples V–X, the entire body of the suspension contained densely packed iridescent flecks similar to those of Examples II–IV; however, the iridescence was slightly bluish green in color.

In Example XI, a soft, iridescent color in the upper portion of the suspension and densely packed iridescent layer in the lower portion of the suspension was formed.

In Example XII a soft iridescent color having angle dependency appeared on the entire body of the suspension.

After the appearance of iridescent effects, that is, after the three-dimensional, non-contiguous regularly arranged structures of latex particles were formed, the said structures were stabilized by polymerizing the polymerizable suspending media by means of heat and/or irradiation of ultra violet light.

In the case of Example II – XI, the sample suspensions were opaque in their appearance, and correspondingly, iridescent flecks formed only at the suspension and container interface. As the polymerization of the suspending medium proceeded, the transparency of the suspension became increased, and at the end of the polymerization, the system became sufficiently transparent to observe the iridescent flecks formed in the deeper portion of the suspension.

In the case of Example XII, iridescent flecks could not be seen in the polymerized composition but iridescent colors having angle dependency were observed.

The iridescent compositions thus obtained showed beautiful iridescent effects, respectively, and had good mechanical strength for practical use.

TABLE I

| Sample Latex Number | Methylmethacrylate-Divinylbenzene Copolymer Latex | | MMA | Degree of Swelling ($\alpha$) | | MMA/DAP 90/10% |
|---|---|---|---|---|---|---|
| | DVB Content vol.% | Particle Diameter A | | MMA/DVB 95/5% | MMA/DVB 90/10% | |
| 1 | 2.5 | 1580 | 4.1 | 3.8 | 4.0 | 3.9 |
| 2 | 5.0 | 1380 | 3.8 | 3.7 | 3.8 | 3.7 |
| 3 | 10.0 | 1330 | 3.7 | 3.6 | 3.7 | 3.6 |

Abbreviations:
MMA, Methylmethacrylate monomer.
DVB, Divinylbenzene monomer.
DAP, Diallylphthalate monomer.
% was expressed by volume.
Particle size was determined by electron microscopy.

TABLE II

| Examples No. | Sample Latex No. | Ratio of Composition of Polymeryzable Monomer | Actual Volume Fraction of Latex | Effective Volume Fraction of Latex | Initiator |
|---|---|---|---|---|---|
| II | 1 | MMA | 0.146 | 0.60 | AIBN |
| III | 1 | MMA:DVB 90:10 | 0.150 | 0.60 | AIBN |
| IV | 1 | MMA:DAP 90:10 | 0.154 | 0.60 | BPO |
| V | 2 | MMA | 0.158 | 0.60 | AIBN |
| VI | 2 | MMA:DVB 90:10 | 0.158 | 0.60 | AIBN |
| VII | 2 | MMA:DAP 90:10 | 0.162 | 0.60 | BPO |
| VIII | 3 | MMA | 0.162 | 0.60 | AIBN |
| IX | 3 | MMA:DVB 95:5 | 0.167 | 0.60 | AIBN + BEE |
| X | 3 | MMA:DAP 90:10 | 0.167 | 0.60 | BPO |
| XI | 1 | MMA:DVB 90:10 | 0.133 | 0.53 | AIBN + BEE |
| XII | 1 | MMA:DVB 90:10 | 0.100 | 0.40 | AIBN + BEE |

Abbreviation:
AIBN, 2,2'-Azobisisobutyronitrile.
BPO, Benzoyl peroxide.
BEE, Benzoylethyl ether.

EXAMPLE XIII

The aqueous, monodispersed methylmethacrylate DVB copolymer latex suspension prepared in Example I was employed. The latex was purified by using mono-bed type ion exchange resin as much as ½ in volume of latex suspension. The purified latex suspension revealed beautiful iridescence and accordingly, was found to have sufficient monodispersity and particle size to be useful in the present invention. The solid content of the latex was determined to be 17.2%. The surface charge density of the latex particles was then determined by titration with 0.01N potassium hydroxide aqueous solution by means of electro-conductometric method.

0.705 ml of potassium hydroxide solution was consumed to attain the neutralization of 10ml of the latex suspension.

To 300ml of the aqueous latex suspension was added 200ml of 0.01 mol/l tetrabutyl ammonium bromide aqueous solution and the mixture was stirred. Upon the addition of tetrabutyl ammonium bromide solution, the latex suspension instantly began to coagulate. A slurry of latex was obtained by removing excess water using a centrifuge.

To the resulting slurry was added 150ml of dichloromethane and the mixture was stirred. Upon continuous stirring, the latex particles in the slurry gradually transfered to the dichloromethane phase leaving water as the upper layer. Weight of non-aqueous latex suspension, wherein the suspending medium was dichloromethane, thus prepared was about 250grms and the solid content of the latex particles was determined to be 20% by weight.

To 105gms of the non-aqueous latex were added 100ml of MMA-DVB (95/5 by volume) mixed monomer and 1 gr. of AIBN, and the mixture was placed in a pyrex glass tube, and was allowed to stand quietly and dichloromethane was permitted to evaporate.

A few days later, iridescent flecks began to appear at the upper portion of the suspension and, about two weeks later the entire body of the suspension contained iridescent flecks.

Decrease in weight by evaporation during this period of time nearly corresponded to that of dichloromethane used as a part of suspending medium.

In the system were dichloromethane had been removed, that is, in the system comprised MMA-DVB (95/5) mixed monomer, the degree of swelling of the particles was $(\alpha) = 3.8$ and correspondingly, the effective volume fraction of particles was 0.57, which was in the range greater than or equal to 0.25 and less than 0.74.

After the substitution of the air with mitrogen gas, polymerization was carried out by the procedures according to Example I.

The product thus obtained had almost the same iridescent effects as that obtained in Example I, but the size of the iridescent flecks was much larger than that obtained in Example I.

EXAMPLE XIV

An aqueous latex of styrene-divinyl benzene copolymer (DVB content was 2.5% by volume) was prepared by emulsion polymerization. Solid content of the latex was determined to be 20% by volume.

To 20ml of latex suspension was added about 10ml of a mono-bed type ion exchange resin and the mixture was agitated. Within about an hour, a beautiful iridescent color was observed and, from this fact, the uniformity in particle size and particle diameter were considered to be satisfied. The particle diameter was determined to be 2,800A by means of electron microscopy.

Fluffy powder of dried latex was obtained from the purified latex by means of liophilization.

5.83 grms of dried latex powder was added to 50ml of MMA monomer, and a non-aqueous latex suspension having 10% by volume solid content was prepared.

From the result obtained by viscosity measurement of the 10% suspension, the degree of swelling of the particles in MMA monomer was $(\alpha) = 2.57$. 14.4 grs of dried latex powder and 50ml of MMA monomer were mixed to obtain a homogeneous non-aqueous latex suspension. The effective volume fraction of the particles in this system was estimated to be 0.55.

Upon quiet standing of the suspension for about 72 hrs, iridescence appeared at the suspension-container interface. The color of the iridescence changed with the change of angle of view and illumination, and accordingly, it was confirmed that the appearance of the iridescence was due to the three-dimensional, regular structure of the particles. To the iridescent suspension was added 0.7% by weight of benzoyl peroxide and was stirred. The iridescent color disappeared at once by the agitation and the suspension became milky white in its appearance. However, upon standing of the suspension, the iridescent color began to reappear with the passage of time. This fact showed that three dimensional iridescent structure of the latex particles were formed in the complete suspension during the quiescent standing of non-aqueous suspension and not during the drying process of aqueous latex.

After the appearance of iridescence, polymerization was initiated by means of U.V. radiation and curing of the material was carried out by means of heating.

EXAMPLE XV

Fluffy powdery dried latex of styrene-divinyl benzene copolymer (styrene/divinylbenzene: 97.5/2.5 by vol.%) was obtained according to the process of Example XIV.

The degree of swelling of the latex particles in MMA-styrene monomer mixture (MMA/St :90/10 by vol.%) was determined to be 2.60.

14.7grs of dried latex powder were dispersed into 50ml of MMA-St monomer mixture; free radical initiator was added; and the dispersion was allowed to stand quietly.

After the appearance of iridescence, polymerization was carried out by conventional means.

The product has good iridescent properties.

EXAMPLE XVI

The procedure of Example XV was followed with the exception that MMA-DVB monomer mixture was used as dispersing medium in lieu of MMA-St monomers mixture.

The degree of swelling of the latex particles in the medium was determined to be 2.63.

14.5grs. of dried latex powder were dispersed into 50ml. of MMA-DVB monomers mixture; free radical initiator was added; and the dispersion was allowed to stand in a quiescent state.

After numerous tiny iridescent flecks had appeared on the entire body of the dispersion, polymerization was carried out by conventional means.

The product thus obtained had outstanding iridescent properties.

EXAMPLE XVII

The procedure of Example XV was repeated substituting MMA-DAP monomer mixture (90/10 by vol.%) in lieu of MMA-St. monomer mixture.

The degree of swelling of the latex particles was determined to be 2.66.

14.3grs. of latex powder and free radical initiator were added to 50ml of MMA-DAP monomers mixture and the dispersion was allowed to stand quietly.

After the iridescence was observed, the entire body of the suspension polymerization was carried out by conventional means.

The product had good iridescent properties.

EXAMPLE XVIII

An aqueous monodispersed latex used in Example XIV was employed. Particle size of the latex was 2,800A. 500 ml of aqueous latex and 1,000 ml of methanol were placed separately in glass container having two cells, which were separated with a cellulose acetate membrane filter having an average pore size of about 0.2 in diameter. Through the membrane, water and methanol mixed with each other freely by diffusion. Methanol containing water was replaced by 1,000 ml of water free methanol once a day. This procedure was repeated about seven times. It showed excellent state of dispersion when a drop of latex suspension thus treated was mixed with benzene. At this point, the water-methanol substitution process was completed. The non-aqueous latex thus obtained, in turn, was again subjected by substitution of suspending medium, that is replacement of methanol with benzene. A non-aqueous latex suspension was finally prepared, wherein the suspending medium was benzene, was concentrated under reduced pressure up to a solids content of about 20% by volume. Actual particle concentration was measured to be 19.8%. To the 110 ml of benzene latex were added 100 ml of MMA monomer, AIBN and BEE and the mixture was allowed to stand in a quiescent state and benzene was permitted to evaporate.

Upon evaporation of benzene, the effective volume fraction of particles began to increase and correspondingly, iridescent flecks began to appear. After the appearance of iridescence, stabilization of the three-dimensional regular structure was accomplished by means of polymerizing the suspending medium. Iridescent effects were almost the same as in the case of Example XIV, however, iridescent flecks thus formed were larger as compared with those of Example XIV.

EXAMPLE XIX

A combination of latex, sample 2 shown in Table I, and MMA-DVB monomer mixture (95/5) was used. 1% of polystyrene was dissolved in a MMA-DVB monomer mixture and the effective volume fraction of sample 2 latex particles was adjusted to a value greater than 0.55 and of course less than 0.74. After the addition of a free radical initiator, the suspension was allowed to stand quietly. After the passage of time, iridescent flecks became observable at the air-suspension and suspension-container interface. Polymerization was carried out by conventional means and an iridescent composition having iridescent flecks throughout the opalescent body was obtained. The iridescent product thus obtained was opalescent in its appearance and had iridescent flecks throughout entire body of the composition.

What is claimed is:

1. A method of making a stabilized, light reflecting, iridescent polymeric material comprising
    a. dispersing dry particles of a polymeric material selected from the group consisting of alkyl esters of methacrylic acid and divinyl benzene; alkyl esters of acrylic acid and divinyl benzene; styrene and divinyl benzene; styrene derivatives and divinyl benzene; alkyl esters of acrylic acid and ethylene glycol dimethacrylate; alkyl esters of methacrylic acid and ethylene glycol dimethacrylate; styrene and styrene derivatives and ethylene glycol dimethacrylate; alkyl esters of acrylic acid and allyl methacrylate; alkyl esters of methacrylic acid and allyl methacrylate; styrene and styrene derivatives and allyl methacrylate in a polymerizable suspending medium comprising an ethylenically unsaturated monomer having a refractive index different from that of the polymeric material and having no measurable solubilizing effect on the polymer particles to form a non-aqueous latex,
  1. said non-aqueous latex containing substantially uniform particles having an average particle diameter in the range from about 500 to about 10,000A, the uniformity of the individual particles being such that at least 80% of the mass of particles has a particle size within ± 10% of the average particle size of the entire mass, and
  2. said non-aqueous latex particles having an effective volume fraction of from about 0.25 to about 0.74;
 b. permitting the non-aqueous latex to stand quietly for a time sufficient to form a three-dimensional, non-contiguous, regularly arranged structure of substantially uniform particles, the particles within the structure having a center to center distance of from about 1500 to about 15,000A, and
 c. polymerizing the polymerizable suspending medium surrounding the particles to form a stabilized, light-reflecting, polymeric material exhibiting intense color caused by optical discontinuity.

2. The method according to claim 1 wherein the refractive index difference between the particles and the polymeric surrounding medium is expressed by the formula $$0.1 \geq \left|\frac{n_1 - n_2}{\alpha}\right| > 0$$

wherein $n_1$ is the average refractive index of the polymeric surrounding medium, $n_2$ is the average index of the polymeric particles and $\alpha$ is the degree of swelling of the particles in the polymerizable suspending medium.

3. The method according to claim 1 wherein the polymerizable suspending medium is selected from the group consisting of alkyl acrylates, alkyl methacrylates, styrene, styrene derivatives, alkyl maleates, alkyl fumarates, diallyl phthalate and mixtures thereof.

4. The method according to claim 1 wherein the particles of the arranged structure are non-contiguous by having positioned between each of the particles polymerized suspending medium.

5. The method according to claim 2 wherein the polymerizable medium is a member selected from the group consisting of methyl methacrylate, ethyl methacrylate, chloroethyl methacrylate, allyl methacrylate, n-propyl methacrylate, iso-propyl methacrylate, methallyl methacrylate, n-butyl methacrylate, iso-butyl methacrylate, n-amyl methacrylate, iso-amyl methacrylate, cyclohexyl methacrylate, n-hexyl methacrylate, benzyl methacrylate, n-octyl methacrylate, ethylene glycol methacrylate, ethylene glycol dimethacrylate, methyl acrylate, ethyl acrylate, n-propyl acrylate, iso-propyl acrylate, n-butyl acrylate, n-amyl acrylate, n-hexyl acrylate, n-heptyl acrylate, n-octyl acrylate, vinyl acrylate, allyl acrylate, styrene, methyl styrene, dimethylstyrene, ethylstyrene, diethylstyrene, divinylbenzene, iso-propylstyrene, o-n-butylstyrene, chlorostyrene, o-chloro-methylstyrene, dichlorostyrene, o-bromostyrene, methoxystyrene, o-cyanostyrene, para-cyano-methylstyrene, dimethyl maleate, diethyl maleate, di-n-butyl maleate, dimethyl fumarate, dimethyl itaconate diethyl itaconate, vinyl acetate, vinyl butyl butyrate, vinyl chloride, diallyl maleate, diallyl phthalate, diallyl sebacate, and butadiene.

* * * * *